Oct. 25, 1932.                C. M. HATHAWAY                1,883,907
                            AUTOMATIC OSCILLOGRAPH
                             Filed June 5, 1931
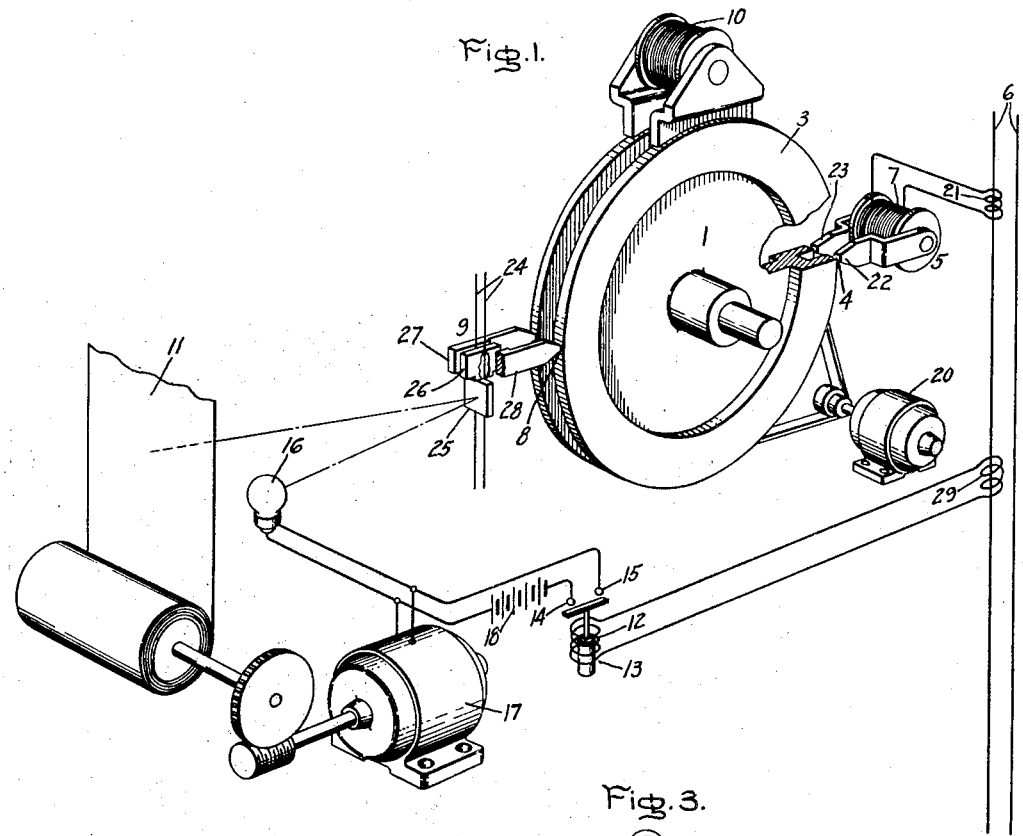
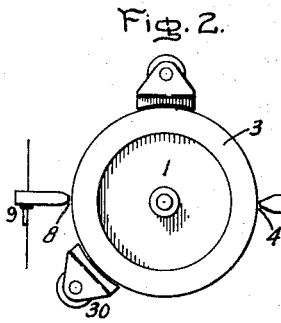
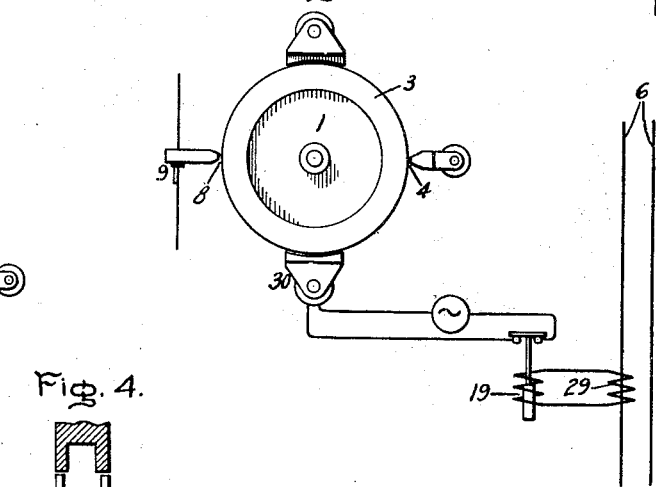
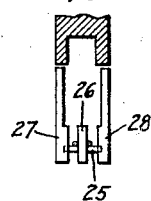
Inventor:
Claude M. Hathaway,
by *Charles E. Tullar*
    His Attorney.

Patented Oct. 25, 1932

1,883,907

UNITED STATES PATENT OFFICE

CLAUDE M. HATHAWAY, OF COLORADO SPRINGS, COLORADO, ASSIGNOR TO GENERAL ELECTRIC COMPANY, A CORPORATION OF NEW YORK

AUTOMATIC OSCILLOGRAPH

Application filed June 5, 1931. Serial No. 542,335.

My invention pertains to improvements in oscillographs and particularly to the type of oscillograph which automatically records circuit disturbances.

Heretofore oscillographs have been known which are set into operation by a circuit disturbance and which begin recording very shortly after the disturbance takes place. These oscillographs have the obvious disadvantage that they do not record the conditions of the circuit preceding the disturbance nor do they record the very beginning of the disturbance itself.

An object of my invention is to record the conditions of the circuit previous to and leading up to the disturbance.

Another object of my invention is to record the entire disturbance or any part thereof.

My invention will be better understood from the following description taken in connection with the accompanying drawing and its scope will be pointed out in the appended claims.

Referring to the drawing, Fig. 1 shows an embodiment of my invention, partly in cross-section, and with the proper circuit connections; Fig. 2 shows an embodiment of my invention with an additional demagnetizing solenoid so that the pick-up apparatus is permitted to function only at desired periods of time; Fig. 3 shows the apparatus of Fig. 2 with the proper circuit connections and with the additional demagnetizing solenoid in an altered position in order to indicate its position is merely a matter of design to meet varying conditions, and Fig. 4 is a detailed diagram of the pick-up device shown in Fig. 1.

Fig. 1 shows a method of recording both circuit disturbances and the normal conditions of such circuit just prior to such disturbance, by which method the circuit conditions, normal and abnormal, are stored in the form of magnetism and subsequently recorded on a photo-sensitive film.

The apparatus of Fig. 1 includes a wheel 1 with a rim 3 of magnetic material driven by a prime mover shown in the figure as a motor 20. The prime mover drives the wheel preferably at a constant speed and as the wheel passes beneath the magnetizing device 5, the portion of it that is immediately under the pole tips of the magnetizing device 5 is magnetized responsive to the conditions of the circuit 6. When this portion of the wheel arrives at the point 8, the magnetic condition of such portion influences the pick-up galvanometer 9 in accordance with the intensity of such magnetic condition. The movements of the pick-up galvanometer are reflected on the photo-sensitive film 11 whereby an accurate record of the conditions of line 6 is obtained.

The energization of the magnetizing device 5 is accomplished by means of a coil 7 which is connected to a current transformer 21, the latter being in circuit with the line 6. It is to be understood that a potential transformer can be used in place of the current transformer 21. The magnetizing device 5 is provided with pole tips 22 and 23 so that the lines of force can be concentrated in the portion of the wheel directly beneath such magnet.

The pick-up galvanometer 9 may comprise suspension cords 24 on which are mounted a mirror 25 and a permanent magnet 26, the latter being arranged between the pole pieces 27 and 28 which are formed of magnetic material and which are magnetized in accordance with the magnetic condition of the rim 3 of the wheel 1. The mirror will oscillate responsive to such magnetic condition but such oscillations will not ordinarily be recorded since the film 11 is not in motion nor is the lamp 16 lighted.

For starting the film motor 17 and for lighting the lamp 16 I provide a quick-acting relay 12 connected by means of a current transformer 29 to the circuit the conditions of which are to be recorded. This relay is set to operate when abnormal conditions of the line 6 prevail. This relay, which preferably has a time delay in opening, is provided with an armature 13 which, when the relay operates, closes the circuit through relay contacts 14 and 15, thus completing the circuit of the lamp 16 and the motor 17 through the battery 18.

Assuming a wheel rotation in a clockwise direction I provide between point 8, directly beneath the pick-up device 9 and the point 4, directly beneath the magnetizing device 5, a demagnetizing solenoid 10 which demagnetizes the rim 3 in order that such rim may accurately record the magnetic impulses received by it from the recording device. The lens system between the lamp 16, the mirror 25 and the film 11 is shown diagrammatically because such systems are old in the prior art and are not considered a part of this invention per se.

In the modification shown in Figs. 2 and 3, I have placed a demagnetizing solenoid 30 between points 4 and 8 in order to demagnetize the rim 3 during normal circuit conditions before it reaches the pick-up galvanometer, 9, in order to prevent fatigue of the pick-up galvanometer. This demagnetizing solenoid must be deenergized during abnormal conditions of the circuit so that disturbances can be recorded. This can be accomplished by making its deenergization dependent upon the operation of relay 19 which is set to operate at the same time as relay 13 and which preferably is also of the time delay type. Such a relay is shown in Fig. 3 connected to the circuit 6 by means of the current transformer 29. The demagnetizing solenoid 30 is shown in a different position in Fig. 3 than in Fig. 2 indicating that its position is dependent on the characteristics desired and is therefore a matter of design.

In explaining the operation of the above described apparatus it will be assumed that the motor 20 is energized and the wheel 1 rotating continuously. The magnetizing coil 7 is excited by a current proportional to that in the circuit 6. The magnetizing coil magnetizes the rim 3 of the wheel 1 at point 4 as the rim rotates adjacent to it. The pick-up galvanometer 9 is active at all times but its action is not recorded until the film 11 is in motion and the lamp 16 is lighted. When a disturbance is created on line 6, the quick acting relay 12, which is set to operate when abnormal conditions of circuit 6 exist, attracts its armature 13 which closes the circuit across contacts 14 and 15, and thus connects the lamp 16 and motor 17 across the battery 18, causing the lamp to become lighted and the motor 17 to start the film in motion. The recording by the film begins before the impulse caused by the disturbance arrives at point 8, thus resulting not only in completely recording the complete disturbance but also in recording the normal condition of the line as existing just prior to such disturbance. This takes place because the normal record is stored in the wheel 1 between point 8 and the point on the rim 3 which was first energized by the current due to the disturbance and which is approaching point 8 but is still at a distance from that point.

In the modification shown in Figs. 2 and 3, the demagnetizing solenoid 30 is disconnected at the same time that the lamp 16 is lighted and the motor 17 started. The demagnetizing solenoid 30 is so positioned that it is disconnected while a portion of the rim approaching it contains the magnetic impulses caused by normal conditions of the circuit 6, thus allowing the pick-up galvanometer 9 not only to record the entire disturbance but also the conditions just prior to the disturbance.

While I have shown and described what I consider to be the best embodiment of my invention, I do not desire to be limited to the exact arrangement disclosed and described, but I seek to cover in the appended claims all those modifications which come within the true spirit and scope of my invention.

What I claim as new and desire to secure by Letters Patent of the United States, is:

1. The method of recording both conditions leading up to a circuit disturbance and the disturbance itself which consists in temporarily magnetically storing the effect of said conditions and causing the recording of a predetermined portion of the circuit conditions preceding said disturbance in response to said disturbance and also recording the disturbance.

2. An oscillograph including a member of magnetic material, stationary means at one point for magnetizing said member in accordance with circuit conditions, stationary means at a second point responsive only to abnormal circuit conditions for recording the magnetic condition of said magnetic member, and means for moving said magnetic member from said first point to said second point.

3. An oscillograph comprising a member of magnetic material, means for magnetizing said member in response to variations in circuit conditions and means responsive only to abnormal circuit conditions for automatically recording the magnetic condition of said member to obtain a record of such variations, said magnetizing and recording means being relatively movable with respect to said magnetic member.

4. An oscillograph comprising a wheel with a rim of magnetic material, means for magnetizing a portion of said rim in accordance with circuit conditions, means for recording the magnetic condition of said rim said magnetizing and recording means being relatively movable with respect to said rim, and means for placing said recording means in a condition for recording before said magnetized portion of said rim comes within the range of said recording means.

5. An oscillograph comprising a wheel with a rim of magnetic material, means for rotating said wheel at substantially a constant speed, stationary means at one point for magnetizing a portion of said rim in accordance with circuit conditions, stationary means at a second point for recording the magnetic condition of said rim, means for placing said recording means in a condition for recording before said magnetized portion of said rim comes within the range of said recording means, and means for causing the said magnetized portion of said rim to become demagnetized after it passes said recording means and before it again reaches the magnetizing means.

6. An oscillograph comprising a member of magnetic material, means for magnitizing a portion of said member in accordance with a circuit condition, means for subsequently recording the magnetic condition of said portion of said member, and demagnetizing means which permits said portion of said member to influence said recording means only when circuit conditions are abnormal.

7. An oscillograph comprising a wheel with a rim of magnetic material, means for rotating said wheel at a substantially constant rate of speed, stationary means at one point for magnetizing a portion of said rim in accordance with a circuit condition, stationary means at a second point for recording the magnetic condition of said portion of said rim, and demagnetizing means for said rim between said first and second points rendered inactive in response to an abnormal circuit condition.

8. An oscillograph comprising a wheel with a rim of magnetic material, means for rotating said wheel, stationary means at one point for magnetizing a portion of said rim in accordance with a circuit condition, stationary means at a second point for recording the magnetic condition of said portion of said rim, demagnetizing means between said first and second points which permits said portions of said rim to influence said recording means only shortly prior to and including the time of a circuit disturbance, and a second demagnetizing means to demagnetize said portion of said rim after it passes said recording means and before it reaches said magnetizing means.

9. In combination with an electric circuit, means influenced in response to the condition of said circuit for producing and temporarily preserving a magnetic record of such condition, an oscillograph recorder, means responsive to an abnormal condition of said circuit for starting said oscillograph recorder into operation, and means for causing the oscillograph recorder to reproduce the magnetic record of the abnormal condition of said circuit after the oscillograph recorder has been started into operation.

10. In combination, an electric circuit, a normally inactive oscillograph recorder for recording abnormal conditions of said circuit, means responsive to an abnormal condition of said circuit for starting said oscillograph recorder into operation, and normally active means for producing and temporarily storing a magnetic record of all of the circuit conditions and then influencing the oscillograph recorder to reproduce a record of the abnormal conditions and normal circuit conditions for only a predetermined period preceding the abnormal condition after the oscillograph is in operation.

11. The method of recording the conditions leading up to a circuit disturbance and the disturbance itself which consists in temporarily magnetically storing a record of the effect of all circuit conditions and on the occurrence of a disturbance and in response thereto producing a visible record from the magnetically stored record covering a period just previous to and during said disturbance.

12. The method of recording those conditions leading up to a circuit disturbance and the disturbance itself which consists in continuously magnetically storing a record of the effect of all circuit conditions as they occur, continuously destroying the record after a predetermined short interval of time after it is made, and on the occurrence of a disturbance discontinuing such destruction and recording the portion of the record not destroyed, and also the record of the disturbance.

13. An oscillograph comprising means for continuously magnetically storing a record of all circuit conditions, means for continuously destroying the record after a predetermined short interval of time after it is made, and means responsive to a circuit disturbance for discontinuing such destruction and making a visible record of the portion of the record not destroyed and also of the record of the disturbance.

In witness whereof I have hereunto set my hand.

CLAUDE M. HATHAWAY.